US007114130B2

(12) United States Patent
Costea et al.

(10) Patent No.: US 7,114,130 B2
(45) Date of Patent: *Sep. 26, 2006

(54) SYSTEM, METHOD, AND COMPUTER-READABLE MEDIUM FOR DISPLAYING KEYBOARD CUES IN A WINDOW

(75) Inventors: Mihai Costea, Redmond, WA (US); Gerardo Bermudez, Redmond, WA (US); Michael A. Schmidt, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 373 days.

This patent is subject to a terminal disclaimer.

(21) Appl. No.: 10/412,787

(22) Filed: Apr. 10, 2003

(65) Prior Publication Data

US 2003/0174158 A1  Sep. 18, 2003

Related U.S. Application Data

(63) Continuation of application No. 09/332,285, filed on Jun. 11, 1999, now Pat. No. 6,657,645.

(51) Int. Cl.
 *G06F 3/00* (2006.01)
 *G06T 11/00* (2006.01)
(52) U.S. Cl. ..................... 715/805; 715/846
(58) Field of Classification Search ........ 715/802, 715/804–805, 744–747, 771–773
See application file for complete search history.

(56) References Cited

U.S. PATENT DOCUMENTS

| | | | | |
|---|---|---|---|---|
| 5,237,654 | A | * | 8/1993 | Shackelford et al. ....... 715/804 |
| 5,371,844 | A | | 12/1994 | Andrew et al. |
| 5,491,495 | A | | 2/1996 | Ward et al. |
| 5,491,795 | A | * | 2/1996 | Beaudet et al. ............ 715/804 |
| 5,550,967 | A | | 8/1996 | Brewer et al. |
| 5,666,502 | A | | 9/1997 | Capps |
| 5,671,379 | A | | 9/1997 | Kuse et al. |
| 5,729,754 | A | * | 3/1998 | Estes .......................... 712/15 |
| 5,732,228 | A | * | 3/1998 | Jaaskelainen, Jr. .......... 715/862 |
| 5,740,444 | A | * | 4/1998 | Frid-Nielsen ............... 717/102 |
| 5,790,127 | A | | 8/1998 | Anderson et al. |
| 5,835,088 | A | * | 11/1998 | Jaaskelainen, Jr. .......... 715/803 |
| 5,838,319 | A | * | 11/1998 | Guzak et al. ............... 715/854 |
| 5,877,764 | A | | 3/1999 | Feitelson et al. |

(Continued)

OTHER PUBLICATIONS

IBM Technical Disclosure Bulletin, "Flowing a Presentation Parameter When Using Related Objects," v37, issue 7, pp. 493-494, Jul. 1994.*

*Primary Examiner*—Steven P Sax
(74) *Attorney, Agent, or Firm*—Christensen O'Connor Johnson Kindness[PLLC]

(57) ABSTRACT

A mechanism for predicting whether user interface elements, such as keyboard cues, would be helpful to a computer user and either displaying or hiding the user interface elements based on that prediction is disclosed. Briefly described, an identification is made whether the last input device was a keyboard or a pointing device, such as a mouse. If the last input device was a pointing device, the keyboard cues are hidden. If the last input device was a keyboard, the keyboard cues are displayed. If the input device changes after the keyboard cues have been initially either hidden or displayed, a message so indicating is passed up the window hierarchy. Upon receiving the message, the top-level window responds by causing the display states of all the windows in the window hierarchy to be updated to reflect the changed input device

16 Claims, 5 Drawing Sheets

U.S. PATENT DOCUMENTS

| | | |
|---|---|---|
| 5,894,306 A | 4/1999 | Ichimura |
| 5,920,476 A | 7/1999 | Hennessey et al. |
| 5,933,143 A * | 8/1999 | Kobayashi .................. 715/805 |
| 6,002,397 A | 12/1999 | Jaaskelainen, Jr. |
| 6,177,933 B1 | 1/2001 | Young |
| 6,182,133 B1 * | 1/2001 | Horvitz ...................... 709/223 |
| 6,356,285 B1 * | 3/2002 | Burkwald et al. .......... 715/853 |
| 6,400,996 B1 | 6/2002 | Hoffberg et al. |
| 6,418,424 B1 | 7/2002 | Hoffberg et al. |
| 6,430,583 B1 * | 8/2002 | Taguchi ................... 715/501.1 |
| 6,657,645 B1 * | 12/2003 | Costea et al. ............... 715/805 |
| 2002/0033850 A1 * | 3/2002 | Bates et al. ................. 345/853 |

\* cited by examiner

SYSTEM, METHOD, AND COMPUTER-READABLE MEDIUM FOR DISPLAYING KEYBOARD CUES IN A WINDOW

CROSS-REFERENCE TO RELATED APPLICATION

This application is a continuation of U.S. patent application Ser. No. 09/332,285, filed Jun. 11, 1999 now U.S. Pat. No. 6,657,645.

FIELD OF THE INVENTION

The present invention relates generally to computer software for displaying content on a computer display screen. More particularly, the present invention relates to computer software for displaying keyboard cues in a window portion of a computer display screen.

BACKGROUND OF THE INVENTION

Many users of computer systems become frustrated with excessive screen clutter. Some users dislike an application window that is cluttered with unnecessary graphics. Dialog box windows especially tend to suffer from this problem. For example, some operating systems provide keyboard cues such as focus indicators and keyboard accelerators. A focus indicator is typically a dashed-line box drawn on the screen within a button or around text that currently has the focus of the window. The focus indicator aids keyboard users identify what function will be activated by depressing the "enter" key on the keyboard. The focus indicator is unnecessary to users that rely heavily on a pointing device, such as a mouse, to input commands to the computer.

Keyboard accelerators are small lines that underline particular letters of words displayed in a control window. Usually, the underlined letter is depressed in combination with a keyboard key, such as the "Alt" key on keyboards commonly used with the Microsoft Windows operating system, to perform a function. Keyboard accelerators allow a user to select a control without having to navigate a pointing device to it. However, the keyboard accelerators are again of little benefit to a heavy mouse user. Moreover, the keyboard accelerators can sometimes confuse the novice keyboard user because the use of the keyboard accelerators is not intuitive. Accordingly, a need exists for a system or method for displaying or not displaying keyboard cues, such as focus indicators and keyboard accelerators, based on whether a user is predominantly a keyboard user or a mouse user.

SUMMARY OF THE INVENTION

The present invention allows a computer system to hide user interface elements, such as keyboard cues, based on whether the user is a keyboard user or a mouse user. Briefly stated, when a window is created, the window queries the system to determine whether the input that created the window resulted from a keyboard input device or a mouse input device. The window either displays or hides the keyboard cues based on that determination. In other words, the system predicts whether the keyboard cues are helpful to the user based on the last navigation mode, i.e. whether the user caused the window to be created with a keyboard or a mouse. If the input device that resulted in the window creation was a mouse, the window initially hides the keyboard cues. In this manner, extraneous window clutter is decreased for the mouse user. If the input device that resulted in the window creation was a keyboard, the keyboard cues are likely desired by the user and therefore displayed.

The window may change the display state of the keyboard cues. For example, the window may have been created with the keyboard cues initially hidden. If the window notices that the user has begun navigating with the keyboard, the window responds by displaying some or all of the keyboard cues. In one example, if the user depresses the "Tab" key to navigate from button to button or field to field, the window may display the focus indicator. In another example, if the user depresses the "Alt" key, the window may display the keyboard accelerators.

As is known to those skilled in the art, a window may have child windows. Examples of child windows are push buttons, radio buttons, check boxes, list boxes, scroll bars, and text-entry fields. The user may interact directly with a child window with either the mouse or keyboard, possibly resulting in a change in the display state of the keyboard cues in the child window. In that situation, rather than handling the change directly, the child window may pass that information to a window manager which, in turn, passes a message up the window hierarchy to the top-level window. The message may indicate that a change in the display state is warranted based on the input device used to navigate within the child window. The message does not, however, directly cause the change in the display state. When the message reaches the top-level window, the top-level window requests an update of the display state for itself and all its child windows. The system then issues commands to all the windows in the window hierarchy causing each of them to change their respective display states. This aspect ensures that the top-level window and all child windows share the same display state for the keyboard cues. Otherwise, the child window may change its display state while the remaining windows in the window hierarchy do not, resulting in some keyboard cues being displayed while others are not.

In some situations, allowing a child window to prevent a change to the display state of the keyboard cues may be desirable. In that case, a child window, such as a control container manager, may be configured to intercept the message being passed up the window hierarchy before it reaches the top-level window. The window procedure for the intercepting child window may be configured to respond to the message in any conventional way but without continuing to pass the message up the window hierarchy. Because the message does not reach the top-level window, the display states of all the windows in the window hierarchy remains unchanged. Alternatively, the control container manager may issue another message to the window manager to have only those controls updated.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention provides a mechanism for predicting whether keyboard cues would be helpful to a computer user, and either displaying or hiding the keyboard cues based on that prediction. Briefly described, the invention identifies whether a last input device was a keyboard or a pointing device, such as a mouse. If the last input device was a pointing device, the keyboard cues are hidden. If the last input device was a keyboard, the keyboard cues are displayed. The display state of the keyboard cues may change if the input device changes after the keyboard cues have been initially either hidden or displayed. The present invention may be embodied in a computer operating system, such as the "Windows NT" operating system owned and licensed by the Microsoft Corporation of Redmond, Wash.

Figure 1:
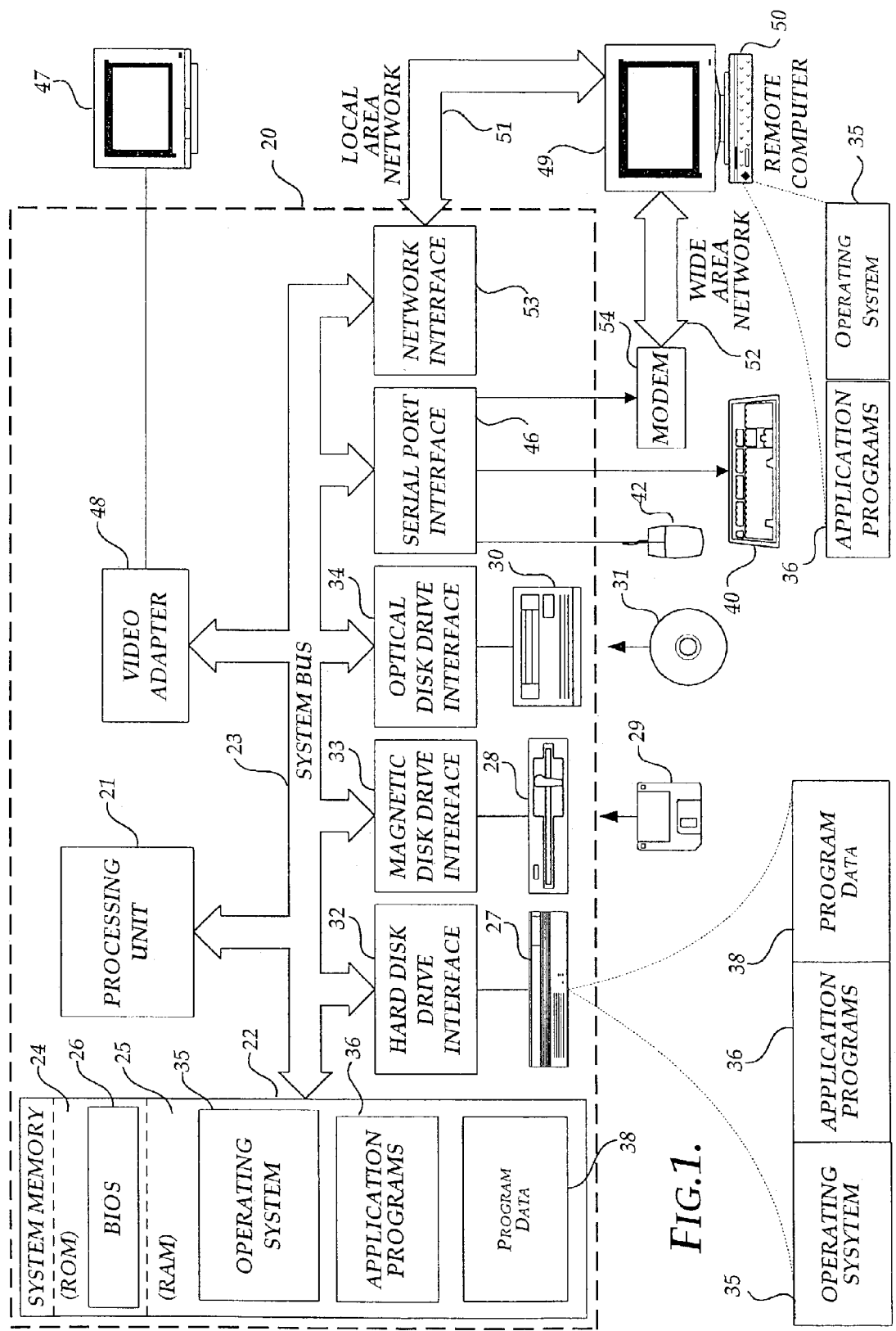
FIG. 1 is a block diagram of a computer suitable for providing an exemplary operating environment for the present invention.

FIG. 1 and the following discussion are intended to provide a brief, general description of a suitable computing environment in which the invention may be implemented. While the invention will be described in the general context of an operating system executing on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network: In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk, and a CD-ROM disk, it should be appreciated by those skilled in the art that other types of media which are readable by a computer, such as magnetic cassettes, flash memory cards, digital video disks, Bernoulli-cartridges, ZIP disks, and the like, may also be used in the exemplary operating environment.

A number of program modules may be stored in the drives and RAM 25, including an operating system 35, such as the Windows NT operating system mentioned above and having one embodiment of the present invention, one or more application programs 36, and program data 38. A user may enter commands and information into the personal computer 20 through input devices such as a keyboard 40 or a mouse 42. Other input devices (not shown) may include a microphone, touchpad, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addiction to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device, or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52. The modem 54 is connected to the system bus 23 via the serial port interface 46. The modem 54 may be internal or external, digital or analog, have a twisted-pair connection or coaxial cable connection, or any other type of modem capable of providing remote connectivity to the personal computer 20. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2A:
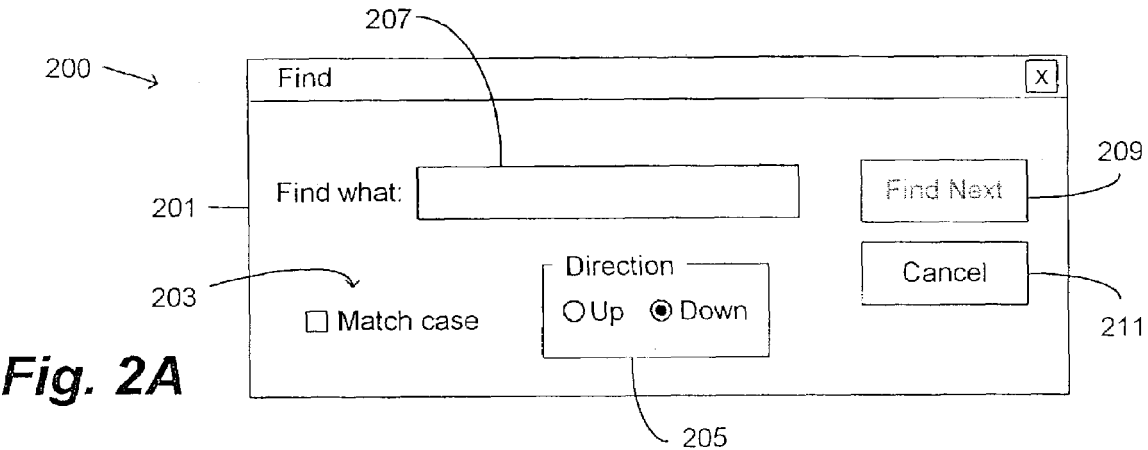
FIG. 2A–2C are exemplary screen displays of a window having child windows and illustrating one embodiment of the present invention in various stages of keyboard cue display.
Figure 2B:
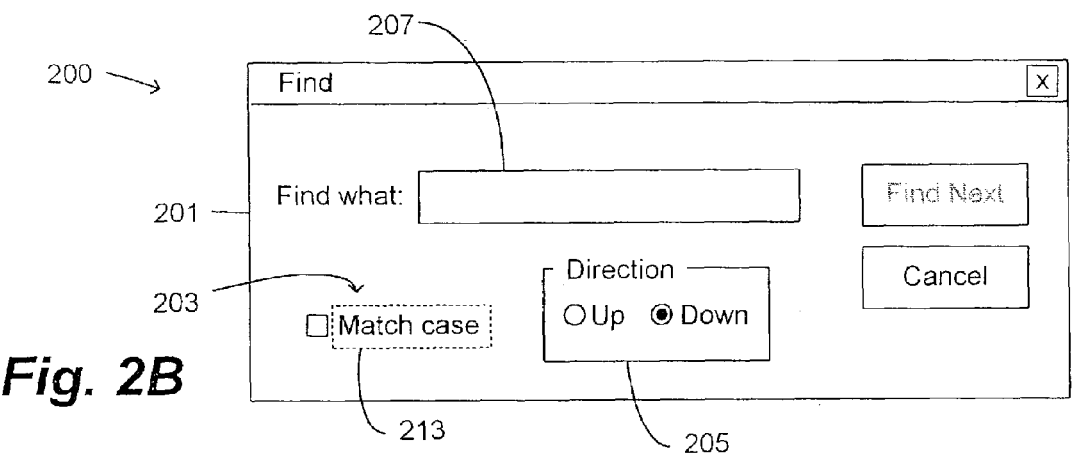
Figure 2C:
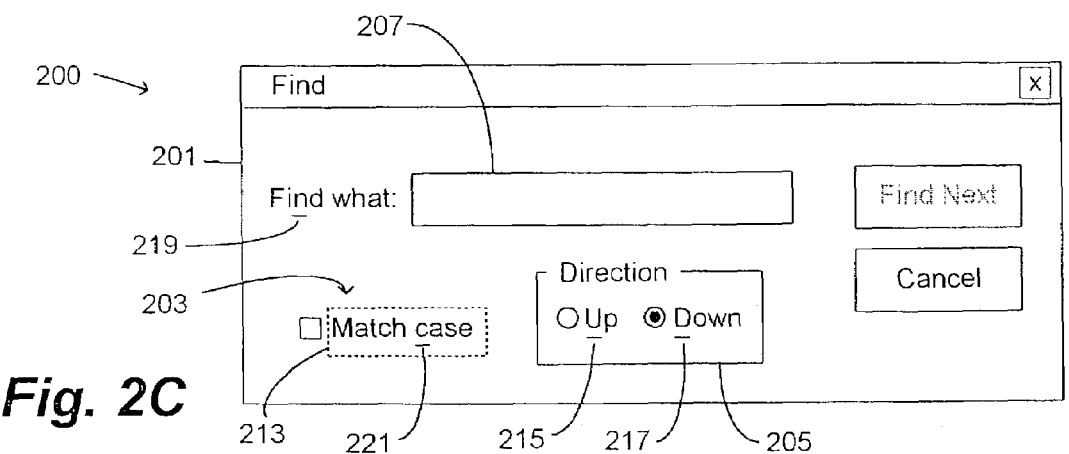

The present invention is best described by example. Accordingly, FIG. 2A–2C are sample screen displays of a window having "child windows," such as controls, and illustrating one embodiment of the present invention in various stages of keyboard cue display. To begin the example, FIG. 2A illustrates the situation where a new dialog box 200 is created. In FIG. 2A, the dialog box 200 is a Find dialog box of the type commonly used by word processing application programs. A dialog box is typically used to present information and receive input from a user.

The dialog box 200 includes a window 201, which is a top-level window. The window 201 is composed of several child windows, such as the match case control 203, the direction control 205, the text box 207, the Find Next push button 209, and the Cancel push button 211. As is known to those skilled in the art, each of the child windows 203–211 are subordinate in a window hierarchy to the top-level window 201.

The dialog box 200 was invoked by some input event. For example, a Find dialog box is often invoked by triggering a Find menu option of a word processing application. Typically, the user can trigger the Find menu option with either a keyboard 40 or a pointing device, such as a mouse 42. Although this discussion focuses primarily on the use of a mouse as a pointing device, the present invention is applicable to any pointing device, such as a touchpad, a graphics tablet, a stylus, a light pen, a joystick, a puck, a trackball, a voice-activated pointer, or the like. In accordance with the present invention, the operating system 35 identifies which of those two input devices (either the keyboard or a pointing device) was used to trigger the Find menu option. The operating system 35 uses the input-device information to set two state bits associated with the window 201. For this discussion, those two state bits are referred to as the "UISTATE" of the window 201. Each of the child windows 203–211 has its own UISTATE and will be discussed below.

One of the UISTATE state bits represents the display state of the focus indicator, and the other of the UISTATE state bits represents the display state of the keyboard accelerators. While this embodiment uses two state bits, those skilled in the art will appreciate that more or fewer state bits may be used to identify the display state of other keyboard cues or window elements. For instance, one state bit may be used to singularly identify the display state for all keyboard cues.

Returning to the example, in response to the Find menu item being triggered, the operating system 35 creates the window 201. As part of its creation, the window 201 initializes the display state of its keyboard cues based on its UISTATE stored by the operating system 35. In this example, the input device used to invoke the dialog box 200 was the mouse 42. Consequently, the UISTATE of the top-level window 201 was set to initially hide both the keyboard accelerators and the focus indicator. The window 201 is accordingly drawn with all its keyboard cues hidden.

When the window 201 causes each of its child windows 203–211 to be created, each of those child windows 203–211 inherits the UISTATE of the top-level window 201. As each child window 203–211 is created, it requests the UISTATE of the top-level window 201. Then, as each child window 203–211 is drawn, their respective keyboard cues are hidden as well. The result is a clean presentation of the dialog box 200 to the mouse user free of undesirable screen clutter. The operating system 35 predicted, because the last input device was the mouse 42, that the keyboard cues would be undesirable to the user. Alternatively, if the keyboard 40 had been used to invoke the dialog box 200, then, when the top-level window 201 was created, the operating system 35 would have initialized the UISTATE to display the keyboard cues. And when each child window 203–211 inherited the UISTATE of the top-level window 201, each child window 203–211 would also have displayed their respective keyboard cues.

Continuing with the example, FIG. 2B illustrates the situation where the user begins navigating within the dialog box 200 with the keyboard 40. The user begins navigating from one control to another by depressing the Tab key on the keyboard 40. As is known to those skilled in the art, when the dialog box 200 is first created, one control within the window 201, such as the text box 207, initially has the focus of the window 201. The Tab key of the keyboard 40 is commonly used to move the focus from one control to another control, such as from the text box 207 to the match case control 203. Other keyboard keys may be used as well, such as the directional arrows commonly found on typical keyboards.

In this example, the window 201 recognizes that the Tab key was used to move the focus from the text box 207 to the match case control 213. Based on that, the window 201 recognizes that the user has changed navigation modes, i.e. the input device being used to navigate within the dialog box 200, from the mouse 42 to the keyboard 40. In response, the window 201 requests the operating system 35 to update the UISTATE of all windows within the dialog box 200.

The operating system 35 responds by issuing a message to each window in the dialog box 200. The message includes the new UISTATE for the windows based on the new navigation mode. Each window passes the message to a default window procedure that handles the message and updates, internally, the UISTATES for each of the windows. The default window procedure then causes the windows to update their respective display states for the keyboard cues to match the new UISTATEs. In this embodiment, the display state of the focus indicator 213 is associated with the Tab key, but the display state of the keyboard accelerators is not. Accordingly, the UISTATE for each window in the dialog box 200 is updated to display the focus indicator 213 as the window receives the focus. However, the UISTATE for each window continues to reflect a hidden display state for the keyboard accelerators. As a result, when the user depresses the Tab key on the keyboard 40, the focus indicator 213 is displayed by each control as the focus moves from control to control.

FIG. 2C illustrates the situation where the user begins to navigate within the dialog box 200 using the keyboard accelerators. Typically, the Alt key is used in combination with one letter of a word displayed by a control to invoke that control. The window 201 recognizes that the user has depressed the Alt key and responds by issuing a command to the operating system 35 to change the UISTATEs of all the windows in the dialog box 200. The operating system 35 responds by updating the UISTATEs of the all the windows and issuing a command to the windows indicating that the keyboard accelerators should be displayed. Each of the windows responds by displaying their respective keyboard accelerators, such as the up accelerator 215, the down accelerator 217, the text box accelerator 219, and the match case accelerator 221. The final result is that the dialog box 200 is displayed with all the keyboard cues shown because the input device being used in the keyboard.

Figure 3:
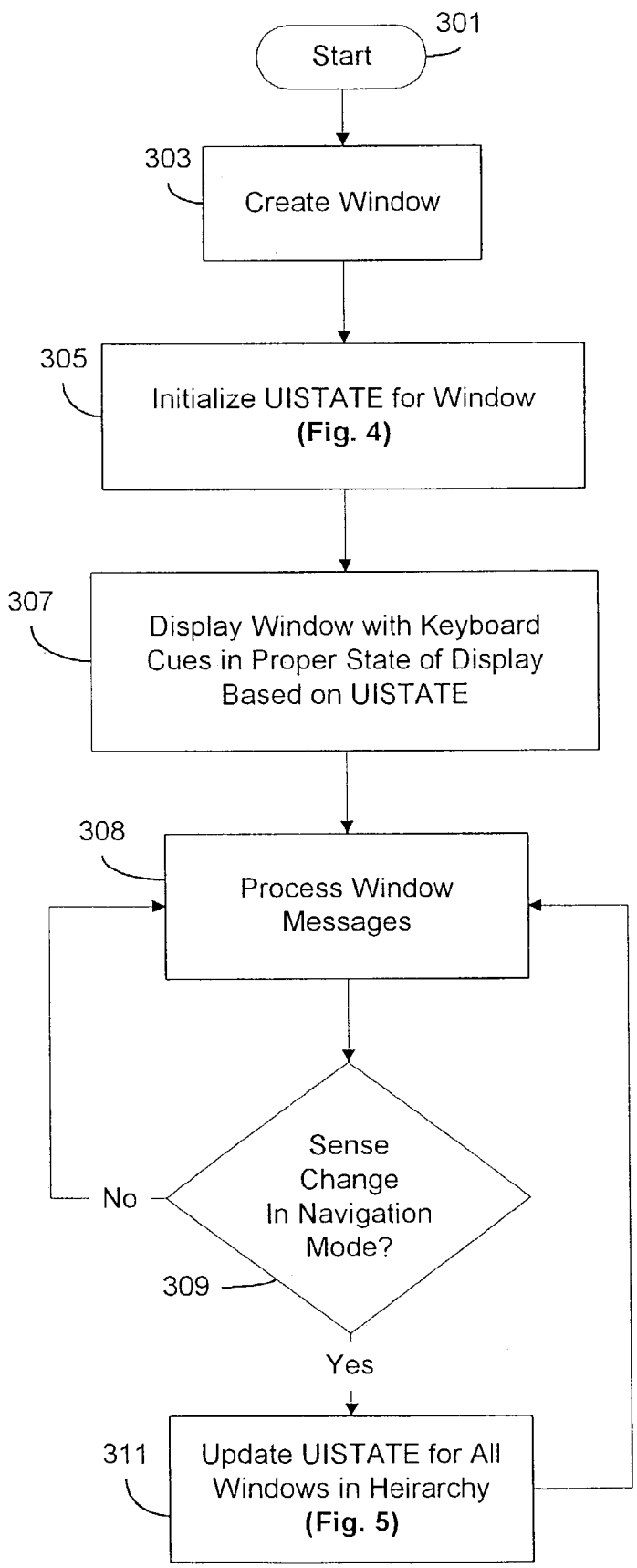
FIG. 3 is a flow chart illustrating a process for creating a window and determining whether to display the keyboard cues based on a last navigation mode.
Figure 4:
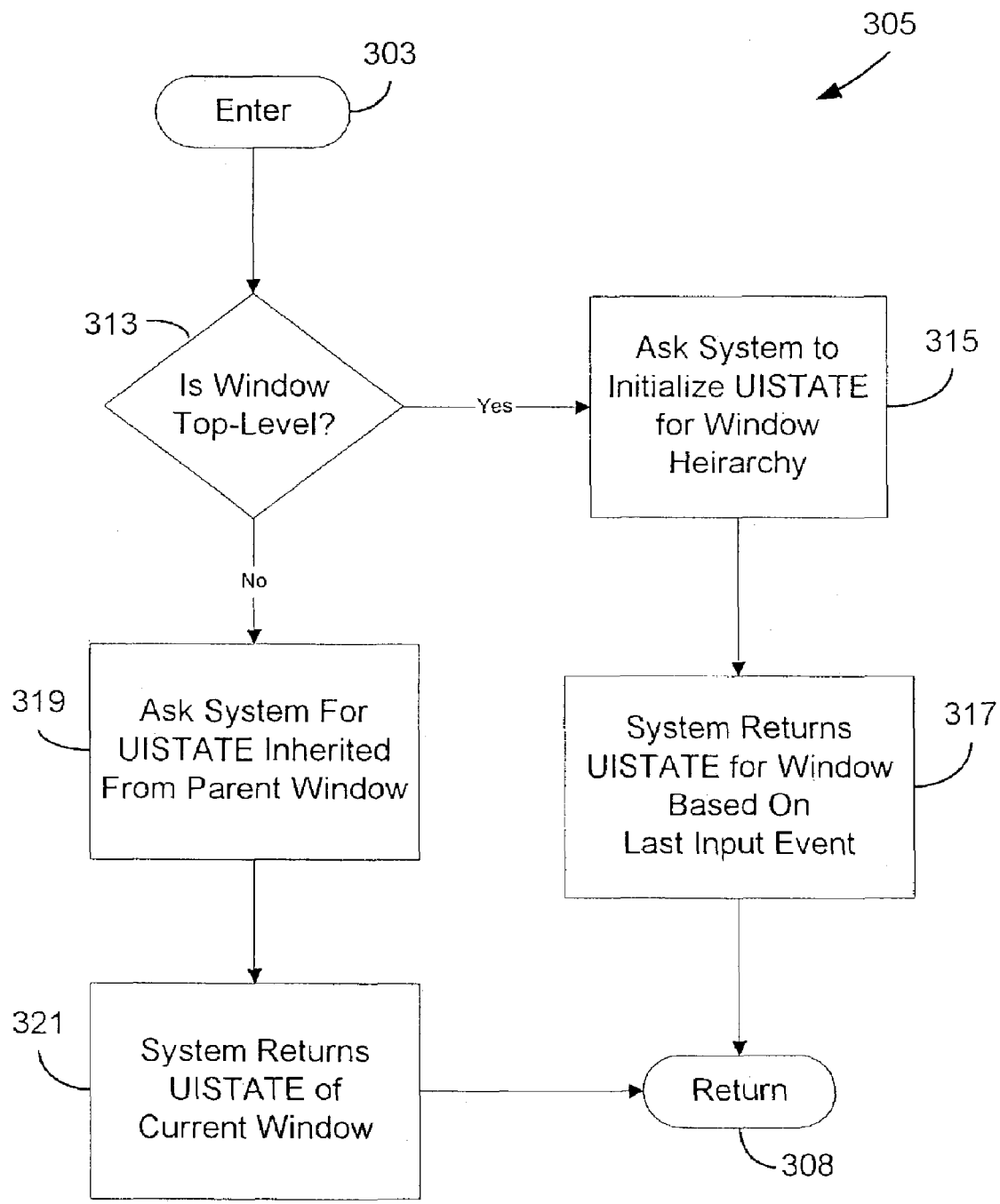
FIG. 4 is a flow chart illustrating in detail the step from FIG. 3 of initializing the display state (UISTATE) of a window.
Figure 5:
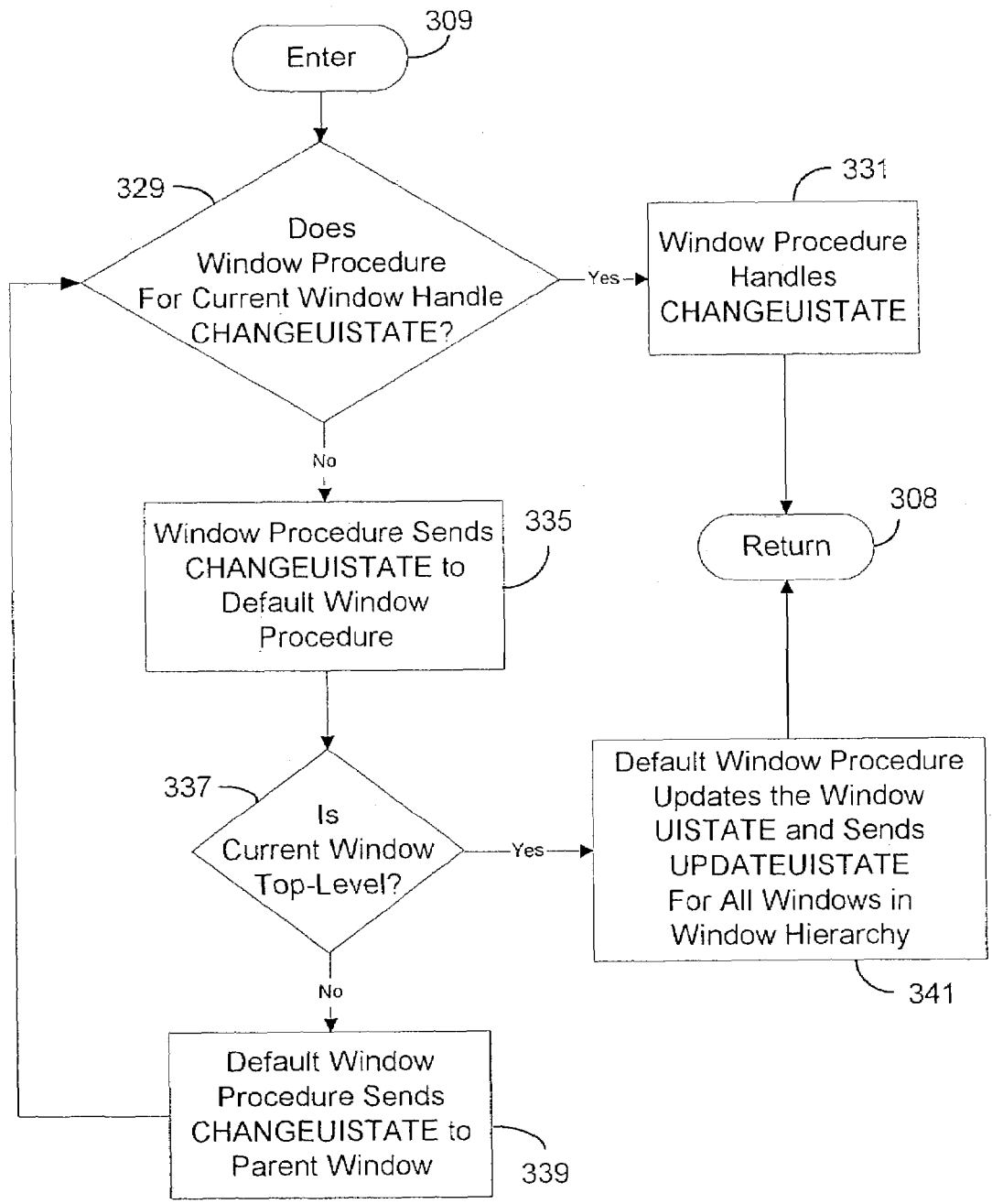
FIG. 5 is a flow chart illustrating in detail the step from FIG. 3 of updating the display state (UISTATE) of a window.

The present invention may also be described as a process for creating windows having keyboard cues appropriately shown or hidden depending on the input device used to invoke the window. FIGS. 3–5, taken in conjunction with FIGS. 1 and 2, illustrate that process.

FIG. 3 is a flow chart illustrating a process for creating a window and determining whether to display keyboard cues based on the navigation mode, i.e. the input device type being used to navigate within the window. The process enters at starting block 301 where an input event has invoked the creation of a window, such as window 201 or text box 207. The operating system 35 recognizes the type of input device that invoked the creation of the window and stores that information. Processing continues at block 303.

At block 303, the window is created. Creating the window may include creating a window procedure for handling input messages directed to the window. Creating the window may also include drawing elements of the window on the computer display screen as well as other administrative tasks performed during the creation of a window, as is known in the art. Processing continues at block 305.

At block 305, the window initializes its UISTATE prior to drawing the keyboard cues associated with the window. Block 305 is illustrated in detail in FIG. 4 and described in detail below. Briefly described, at block 305, the window requests that its UISTATE be initialized by the operating system 35. Based on the input-device information stored above, the operating system 35 sets two UISTATE bits associated with the window. One of the two UISTATE bits is used to indicate whether to hide the focus indicator. The other UISTATE bit is used to indicate whether to hide the keyboard accelerators. As is known to those skilled in the art, a value of "0" may indicate that the corresponding keyboard cue should be hidden, while a value of "1" may indicate that the keyboard cue is to be displayed. The operating system 35 returns the UISTATE to the window. Processing continues at block 307.

At block 307, the window is displayed with its keyboard cues in the proper state of display based on the window's UISTATE. In other words, the window is displayed with the focus indicator hidden if the corresponding state bit of the UISTATE so indicates. Likewise, the window is displayed with the keyboard accelerators shown if the other state bit of the UISTATE so indicates. As mentioned above, the state of the UISTATE bits is dependent on the last input device recognized by the operating system 35. Processing then continues at block 308.

At block 308, the window processes input messages directed to the window. As is known to those skilled in the art, a window has an associated message queue through which input messages are passed to the window. The window procedure for the window operates on each input message as appropriate, and when finished with one message, awaits the next. Processing remains at block 308 until a message is received that includes information about the navigation mode used to create the message, such as if the user depressed the Tab key on the keyboard 40. If, at block 308, the message includes information about the navigation mode, processing proceeds to decision block 309.

At decision block 309, the window determines, based on the navigation mode information from block 308, whether the navigation mode has changed. In other words, the window determines whether the message resulted from a different input device than previously used, such as if the input device previously being used was the mouse 42 but the keyboard 40 was used to issue the most recent message. If the window senses that the user has not changed the navigation mode within the window, then processing follows the No branch and returns to block 308 where the window continues to process messages. If, however, at decision block 309, the window senses that the navigation mode has changed from either the keyboard to the mouse or from the mouse to the keyboard, then processing follows the Yes branch and continues at block 311.

At block 31, the UISTATEs of all windows in the window hierarchy are updated to reflect the new navigation mode unveiled by the message at block 308. Block 311 is illustrated in detail in FIG. 5 and described below. Briefly described, at block 31 1, the window sends a message to the operating system 35 that causes the UISTATEs of all windows in the window hierarchy to be updated in accordance with the new navigation mode identified at decision block 309. Processing then returns to block 308 where the window continues processing messages in the window's message queue.

FIG. 4 is a flow chart illustrating in detail block 305 of the flow chart illustrated in FIG. 3. Block 305 involves the step of initializing the UISTATE of the window. The flow chart of FIG. 4 enters from block 303 where an event has occurred causing the creation of the window. Processing proceeds to decision block 313.

At decision block 313, a determination is made whether the current window being created is a top-level window. As discussed above, windows may exist in a window hierarchy having a top-level window and child windows for which the top-level window is the parent. The first window created in response to a triggering event is often, but not always, the top-level window. If the current window is not the top-level window, processing follows the No branch to block 319, discussed below. If the current window is the top-level window of the window hierarchy, processing follows the Yes branch to block 315.

At block 315, the current window requests the operating system 35 to initialize the UISTATEs for all windows in the window hierarchy for which the current window is the top-level. In one example, the current window may issue a "CHANGEUISTATE" message to the operating system 35. The CHANGEUISTATE message may indicate-to the operating system 35 that a change in the UISTATE is-being requested by the window. The CHANGEUISTATE message may have several parameters. One such parameter may be a "UI_INITIALIZE" statement that causes the operating system 35 to create and assign values to the UISTATE for the current window based on the last input device recognized by the operating system 35. As mentioned above, the operating system 35 monitors the input device type that invoked the creation of the current window. Accordingly, based on that input-device information, the operating system 35 responds to the UI_INITIALIZE parameter by assigning the proper value to the UISTATE bits of the current window. In addition, the operating system 35 may maintain an indication that the UISTATE of the current window is to be inherited by each child window of the current window. Processing proceeds from block 315 to block 317.

At block 317, the operating system 35 returns to the current window a message defining the current window's initial UISTATE based on the last input device. In this embodiment, that message may be an "UPDATEUISTATE" message having as a parameter the current UISTATE of the current window. The UPDATEUISTATE message may be an imperative message that causes the current window to either display or not display the keyboard cues based on the UISTATE parameter passed. For example, if the UISTATE reflects that the mouse was the last input device, then the UPDATEUISTATE message causes the current window to hide all keyboard cues. Processing then returns to block 308 of the flow chart illustrated in FIG. 3.

At block 319, to which the No branch of decision block 313 leads, the current window requests, from the operating system 35, the UISTATE of the current window inherited from its parent window. If processing reaches block 319, the current window is not a top-level window, it is a child window, such as the direction control 205 illustrated in FIG. 2. In that case, the operating system 35 assigned to the current window the UISTATE of its parent window when the creation of the current window began. Therefore, rather than requesting the operating system 35 to initialize the window's UISTATE based on the last input device, the window requests the operating system 35 to provide the UISTATE inherited from the parent window. The current window may send a "QUERYUISTATE" message to the operating system 35 requesting its UISTATE. Processing proceeds from block 319 to block 321.

At block 321, the operating system 35 returns the UISTATE of the current window. Because the UISTATE of each child window is inherited from its parent window, the entire window hierarchy reflects the same display state for the keyboard cues. In that manner, the user is presented with a consistent and aesthetic window appearance free of extraneous window clutter. From block 321, processing returns to block 308 of the flow chart illustrated in FIG. 3.

FIG. 5 is a flow chart illustrating in detail the block 311 shown in FIG. 3 that updates the UISTATE for the window hierarchy. The flow chart of FIG. 5 enters from decision block 309 where a determination was made that the navigation mode has changed. Processing begins at decision block 329.

At decision block 329, in response to the determination that the navigation mode has changed, a determination is made whether to allow that change to affect the display state of the keyboard cues. More specifically, some use of the keyboard may not result in a change to the display state of the keyboard. For example, if the user is currently typing text in a text box, such as text box 207, and begins navigating through the text using arrow keys on the keyboard rather than the mouse, that use of the keyboard may not warrant displaying the keyboard cues.

One mechanism for tolerating some keyboard use without changing the display state of the keyboard cues is to configure the window procedure of the current window to handle the CHANGEUISTATE message. As mentioned above and discussed below, the CHANGEUISTATE message indicates to the operating system 35 that a change in the UISTATE is being requested. If however, the window procedure of the current window is configured to handle the CHANGEUISTATE message, then the window procedure does not issue that message, as discussed below, to the operating system. In this manner, the disclosed embodiment provides a mechanism to allow a window to override the change in the display state of the keyboard cues. This concept will become more clear after the discussion below regarding block 339. If the window procedure for the current window handles the CHANGEUISTATE message, processing follows the Yes branch to block 331.

At block 331, the window procedure for the current window responds to the change in navigation mode as defined within that window procedure, rather than by sending the CHANGEUISTATE message to the operating system 35. By allowing the window procedure for the current window to handle the CHANGEUISTATE message, a window may prevent a change to its display state for the keyboard cues and the display state of all the windows in the window hierarchy. As will be apparent to those skilled in the art, the window procedure of the current window may be configured to handle the CHANGEUISTATE message in any conventional manner, such as by ignoring the message or making some other change to the display state of the window. Processing then returns from block 331 to block 308 of the flow chart illustrated in FIG. 3.

If, at decision block 329, the window procedure for the current window does not handle the CHANGEUISTATE message, processing follows the No branch to block 335. At block 335, the window procedure for the current window sends the CHANGEUISTATE message to the Default Window Procedure of the operating system 35. As is known to those skilled in the art, the Default Window Procedure is an operating system service that handles input and output messages that are not handled by a unique window procedure.

As discussed above, the CHANGEUISTATE message indicates to the operating system that a change in the UISTATE is being requested by the window. In addition to the UI_INITIALIZE parameter discussed above, other parameters may be passed with the CHANGEUISTATE message to indicate the proper state of the UISTATE bits. For example, a parameter of the nature "HIDEFOCUS=0" may be passed with the CHANGEUISTATE message. That parameter may instruct the operating system 35 to set one bit in the current window's UISTATE to reflect that the focus indicator should be displayed. Likewise, another parameter of the nature "HIDEACCEL=1" may instruct the operating system to set the other bit to reflect that the keyboard accelerators should be hidden.

The particular parameters selected to be passed with the CHANGEUISTATE message depend on the navigation mode information gathered at block 308 of the flow chart illustrated in FIG. 3. The navigation mode information indicates, if the input device was the keyboard 40, which key or key combination was depressed. Based on that information, this embodiment of the invention determines which parameters to pass and the value for each parameter. For example, depressing the Alt key may be used as an indication that the keyboard accelerators should be displayed because the Alt key is typically used to invoke a keyboard accelerated function. Consequently, if the navigation mode information gathered above indicates that the Alt key was depressed during the last input event, the window procedure for the current window selects a parameter, such as "HIDEACCEL=0," to pass with the CHANGEUISTATE. On the other hand, because the Tab key is often used to navigate from one control to another control, if the navigation mode information indicates that the Tab key was depressed, a different parameter, such as "HIDEFOCUS=0," may be selected. From block 335, processing proceeds to decision block 337.

At decision block 337, in response to the CHANGEUISTATE message from block 335, the Default Window Procedure first determines whether the current window is a top-level window. If the window is not a top-level window, processing follows the No branch to block 339.

At block 339, the Default Window Procedure sends the CHANGEUISTATE message, including the selected parameters, to the parent window of the current window. In this manner, the CHANGEUISTATE message is passed up the window hierarchy until it reaches the top-level window. No changes to the actual UISTATE bits of the windows in the window hierarchy occurs until the top-level window receives the CHANGEUISTATE message. When the Default Window Procedure passes the CHANGEUISTATE message to the parent window, the parent window becomes the current window and processing returns to decision block 329, which again performs as described above.

Those skilled in the art should now appreciate that decision block 329 provides the mechanism for any window in the window hierarchy between the window receiving the input message and the top-level window to intercept the CHANGEUISTATE message. In that way, a window may prevent a change to the display state for any or all of the keyboard cues if the window procedure of that window is configured to handle, the CHANGEUISTATE message rather than pass it to the Default Window Procedure. For example, a control container window having multiple subordinate control windows may not be a top-level window. Allowing the window procedure for the control container window to intercept the CHANGEUISTATE message as it travels up the window hierarchy allows the control container window to independently dictate whether the UISTATEs of the subordinate controls, or any upper-level windows, are modified.

Returning to decision block 337, if a determination was made that the current window is a top-level window, processing follows the Yes branch and processing continues at block 341. At block 341, the Default Window Procedure, recognizing that the current window is the top-level window, updates the UISTATEs of all windows in the window hierarchy in accordance with the parameters passed with the CHANGEUISTATE message. In this way, all of the windows in the window hierarchy share the same UISTATE.

In addition, the Default Window Procedure sends another message, such as an "UPDATEUISTATE" message, to all the windows in the window hierarchy. The UPDATEUISTATE message may be an imperative message that causes each receiving window to alter its display of the keyboard cues in accordance with the new UISTATE. The Default Window Procedure may include parameters with the UPDATEUISTATE message similar to those passed with the CHANGEUISTATE message to indicate the proper display state for each of the keyboard cues. Consequently, each window in the window hierarchy receiving the UPDATEUISTATE message responds by either displaying or hiding the appropriate keyboard cues as defined by the parameters of the UPDATEUISTATE message. From block 341, processing returns to block 308 of the flow chart illustrated in FIG. 3.

Alternative Embodiments

While embodiments of the invention have been illustrated and described, it will be appreciated that various changes and modifications can be made without departing from the spirit and scope of the invention. For example, those skilled in the art will appreciate that the parameters and values provided in this description are merely examples and many other parameters associated with many other keyboard keys or input devices will become obvious upon a study of this discussion, and are equivalent to the examples provided here. For example, if the mouse is identified as the last input device, parameters such as "HIDEACCEL=1" and "HIDEFOCUS=1" may simultaneously be passed.

In addition, other user interface elements not specifically identified here may be displayed or hidden in an equivalent manner through the use of the present invention. For instance, the present invention may be applied to many other user interface elements, such as three-dimensional versus two-dimensional display elements, color versus black-and-white display, icon toolbars versus textual menus, graphical icons versus text-based icons, or the like. Other input devices may also be used in a system embodying the present invention, such as a voice-recognition navigation mechanism.

As another alternative, the benefits of the present invention may provide the ability to force "user interface modes" to accommodate particular users' needs or preferences. For example, keyboard use is not always a matter of personal preference, but may be an accessibility issue for some people. Keyboard cues have a critical value for people that cannot use a mouse. Unfortunately, with existing technologies, software applications can alter the display state of the keyboard cues programmatically. That capability can result in keyboard cues being turned off inappropriately, i.e. even when the user is using the keyboard out of necessity. Therefore, a configuration switch may be used in combination with the present invention to force the display state of the keyboard cues to a predetermined state. The operating system may be configured to override a software application's attempt to alter the display state of the keyboard cues. The configuration switch may also be used to allow the user to customize the behavior of the system. Moreover, the configuration switch addresses the issue of backward compatibility by allowing the system to simulate the behavior of existing technologies. Thus, the embodiments described are for illustrative purposes only, and the present invention is limited only by the following claims.

The invention claimed is:

1. In a computer system having an operating system, the operating system configured to display windows in a window hierarchy, each window being associated with a state indicator including a first state and a second state, a control container window being superior to a subordinate control window in the window hierarchy, a method of displaying a keyboard cue comprising:

dynamically determining a change in a user preference by recognizing a change in input events, each of the input events being triggered by an input device, an input event invoking the creation of a window in the window hierarchy;

if the change in the user preference is determined, causing the state of the state indicator to be changed to reflect the change and determining if the window is the control container window in the window hierarchy;

in response to the first state of the state indicator, displaying the window with the keyboard cue display;

in response to the second state of the state indicator, displaying the window with the keyboard cue hidden;

if the window is the control container window in the window hierarchy, causing all of the subordinate control windows in the window hierarchy to be updated to reflect the changed state indicator; and if the window is not the control container window, passing to a parent window of the window a request to change the state of the state indicator to reflect the changed user preference.

2. The method of claim 1, wherein causing the state of the state indicator to be changed includes:

passing an identification of the input event to the state indicator of the window;

changing the state of the state indicator to the first state if the input event is a keyboard event; and changing the state of the state indicator to the second state if the input event is a pointing device event.

3. The method of claim 2 further comprising:

upon the receipt by the parent window of the request to change the state of the state indicator, causing the state of the state indicator to be changed to reflect the changed user preference; and causing all of the subordinate control windows in the window hierarchy to be updated to reflect the changed state indicator.

4. The method of claim 1, wherein the control container window in the window hierarchy is suitable for preventing the request from being passed to the parent window, the request for changing the state of the state indicator reflecting the changed user preference.

5. The method of claim 1, wherein the act of dynamically determining includes determining the user preference by recognizing that another input event directed to a current window in the window hierarchy was generated by another input device different from a prior input device.

6. The method of claim 5, further comprising identifying the control container window of the current window in the window hierarchy.

7. The method of claim 6, further comprising updating the control container window to reflect the changed state indicator.

8. The method of claim 2, wherein the pointing device event includes an event generated from a group comprising a mouse, a touchpad, a graphics tablet, a stylus, a light pen, a joystick, a puck, a trackball, and a voice-activated pointer.

9. In a computer system having an operating system, the operating system configured to display windows in a window hierarchy, each window being associated with a state indicator including a first state and a second state, a control container window being superior to a subordinate control window in the window hierarchy, a tangible computer-readable medium having computer-executable instructions stored thereon for performing a method of displaying a keyboard cue comprising:

dynamically determining a change in a user preference by recognizing a change in input events, each of the input events being triggered by an input device, an input event invoking the creation of a window in the window hierarchy;

if the change in the user preference is determined, causing the state of the state indicator to be changed to reflect the change and determining if the window is the control container window in the window hierarchy;

in response to the first state of the state indicator, displaying the window with the keyboard cue display;

in response to the second state of the state indicator, displaying the window with the keyboard cue hidden;

if the window is the control container window in the window hierarchy, causing all of the subordinate control windows in the window hierarchy to be updated to reflect the changed state indicator; and if the window is not the control container window, passing to a parent window of the window a request to change the state of the state indicator to reflect the changed user preference.

10. The tangible computer-readable medium of claim 9, wherein causing the state of the state indicator to be changed includes:

passing an identification of the input event to the state indicator of the window;

changing the state of the state indicator to the first state if the input event is a keyboard event; and changing the state of the state indicator to the second state if the input event is a pointing device event.

11. The tangible computer-readable medium of claim 10 further comprising:

upon the receipt by the parent window of the request to change the state of the state indicator, causing the state of the state indicator to be changed to reflect the changed user preference; and causing all of the subordinate control windows in the window hierarchy to be updated to reflect the changed state indicator.

12. The tangible computer-readable medium of claim 9, wherein the control container window in the window hierarchy is suitable for preventing the request from being passed to the parent window, the request for changing the state of the state indicator reflecting the changed user preference.

13. The tangible computer-readable medium of claim 9, wherein the act of dynamically determining includes determining the user preference by recognizing that another input event directed to a current window in the window hierarchy was generated by another input device different from a prior input device.

14. The tangible computer-readable medium of claim 13, further comprising identifying the control container window of the current window in the window hierarchy.

15. The tangible computer-readable medium of claim 14, further comprising updating the control container window to reflect the changed state indicator.

16. The tangible computer-readable medium of claim 10, wherein the pointing device event includes an event generated from a group comprising a mouse, a touchpad, a graphics tablet, a stylus, a light pen, a joystick, a puck, a trackball, and a voice-activated pointer.

* * * * *